US008960244B1

(12) United States Patent
Aylsworth et al.

(10) Patent No.: US 8,960,244 B1
(45) Date of Patent: Feb. 24, 2015

(54) AUTOMATED LUMBER RETRIEVAL AND DELIVERY

(75) Inventors: Steven L. Aylsworth, Chatfield, MN (US); Steven R. Weinschenk, Rochester, MN (US)

(73) Assignee: Steven L. Aylsworth, Chatfield, MN (US)

( * ) Notice: Subject to any disclaimer, the term of this patent is extended or adjusted under 35 U.S.C. 154(b) by 863 days.

(21) Appl. No.: 13/136,922

(22) Filed: Aug. 15, 2011

Related U.S. Application Data

(60) Provisional application No. 61/402,654, filed on Sep. 2, 2010.

(51) Int. Cl.
B27B 31/00 (2006.01)
(52) U.S. Cl.
USPC ..................................................... 144/245.5
(58) Field of Classification Search
USPC ............ 144/356, 245.1, 245.5; 209/517, 518, 209/521; 198/692, 693, 697, 698, 468.6
See application file for complete search history.

(56) References Cited

U.S. PATENT DOCUMENTS

| 2,730,144 | A | | 1/1956 | Joa |
| 3,873,000 | A | | 3/1975 | Eaton et al. |
| 3,952,883 | A | | 4/1976 | Phillips |
| 4,610,360 | A | * | 9/1986 | Forslund ........................ 206/518 |
| 4,640,655 | A | | 2/1987 | Jacobsen |
| 4,838,748 | A | | 6/1989 | Johnson |
| 5,249,915 | A | | 10/1993 | Ritola |
| 5,879,129 | A | | 3/1999 | Newnes et al. |
| 5,899,659 | A | | 5/1999 | Beilsmith |
| 6,065,927 | A | * | 5/2000 | Baron et al. ............... 414/789.5 |
| 6,379,105 | B1 | | 4/2002 | Aylsworth |
| 6,923,614 | B2 | | 8/2005 | Aylsworth |
| 7,746,481 | B2 | | 6/2010 | Kranz et al. |
| 7,950,316 | B2 | | 5/2011 | Koskovich |

OTHER PUBLICATIONS

Miser; Automated Wood Processing System; Koskovich brochure; 5 pgs. Rochester, MN; copyright 2007.
OMNI; Automated Lumber Processing System; CAD drawings; 2 pgs.; published 2008 or earlier.
Wood Truss Systems; 2006 Weinmann WBZ 100 Linear Saw; sales advertisement; 2 pgs.; equipment itself in public domain in 2006 or earlier.

(Continued)

*Primary Examiner* — Edward Tolan
*Assistant Examiner* — Matthew G Katcoff
(74) *Attorney, Agent, or Firm* — www.bobharter.com; Robert J. Harter

(57) ABSTRACT

An automated lumber handling system laser-scans the top profile of multiple stacks of lumber, each of which contain boards of a unique size. Based on the scanned profiles, the system determines the order in which individual boards from a chosen stack should be transferred to a numerically controlled saw. The saw cuts the boards to proper size, and in the proper sequence to facilitate orderly assembly of a roof truss or prefabricated wall. In some examples, the system lifts individual boards by driving two retractable screws, or some other piercing tool, down into the upward facing surface of the board. A track mounted cantilever, holding the screws and a laser unit, translates over the lumber stacks to retrieve and deliver individual boards and, while doing so, the laser repeatedly scans the stacked lumber profiles on-the-fly to continuously update the profiles. The open cantilever design facilitates replenishing the stacks of lumber.

15 Claims, 17 Drawing Sheets

(56) References Cited

OTHER PUBLICATIONS

Handling Portal WHP; Weinmann sales specs.; one page; published 2008 or earlier.

Stiles; Weinmann Robotic Saw System; sales literature and equipment specs; 6 pages; equipment itself in public domain in 2008 or earlier.

* cited by examiner

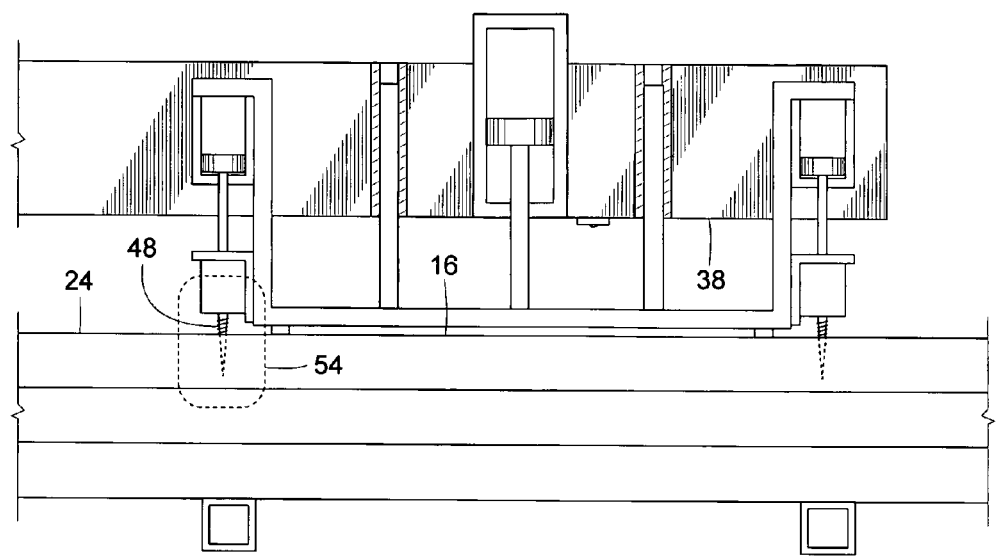
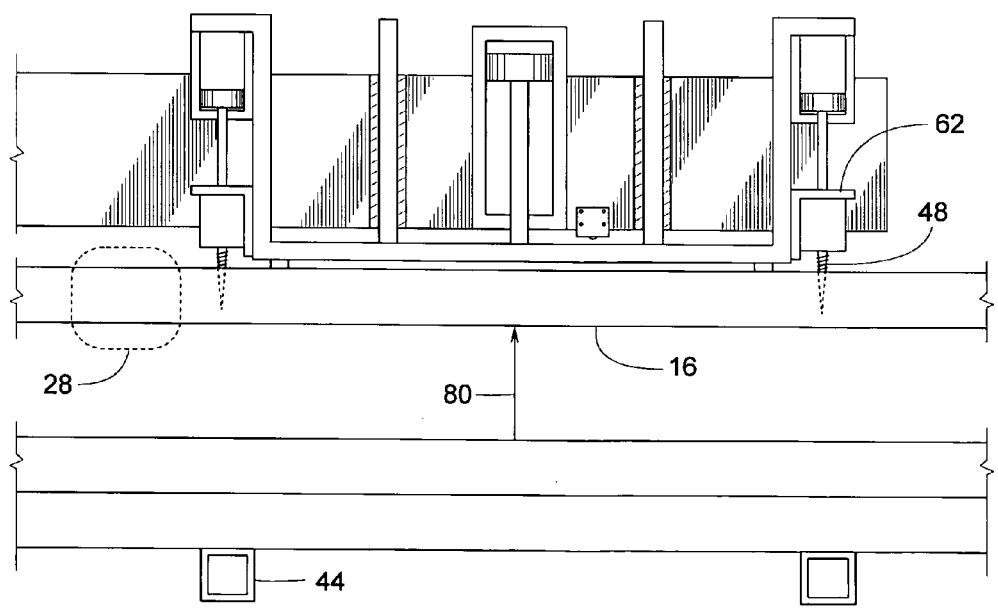

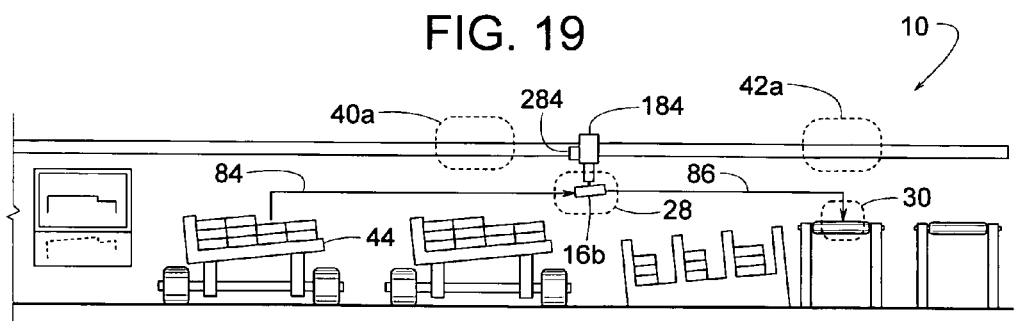
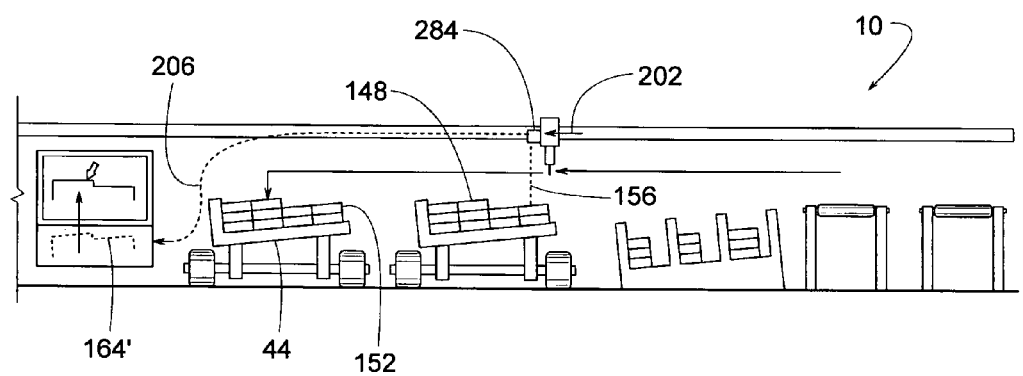
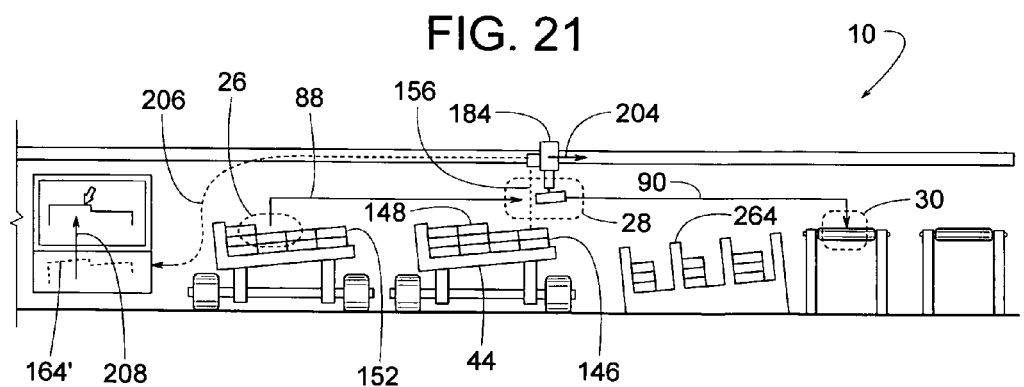

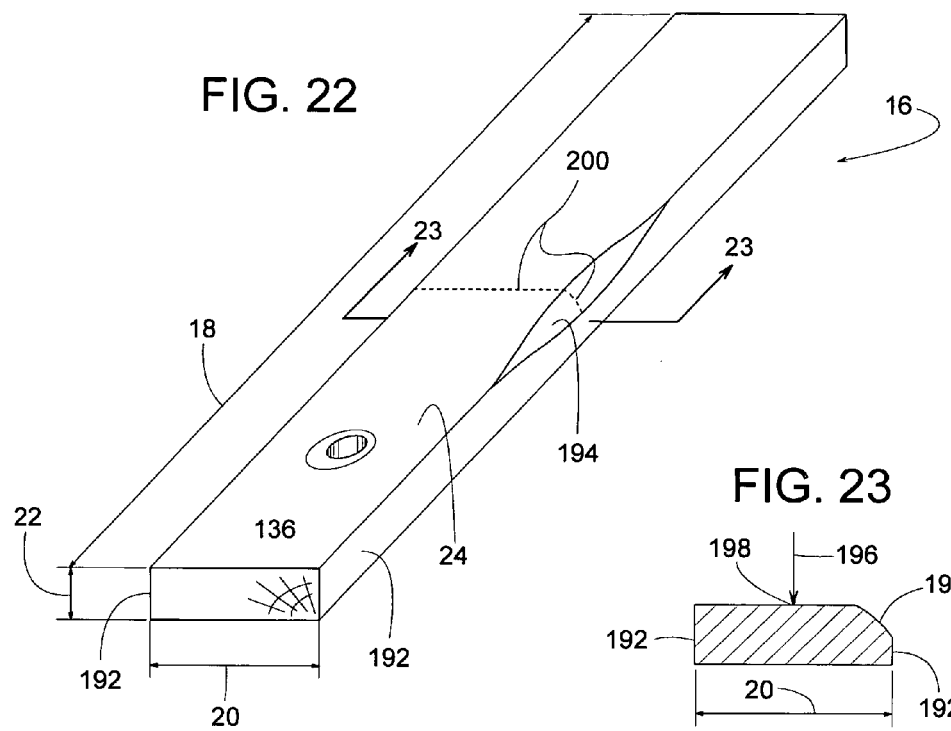
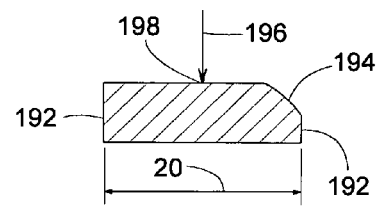
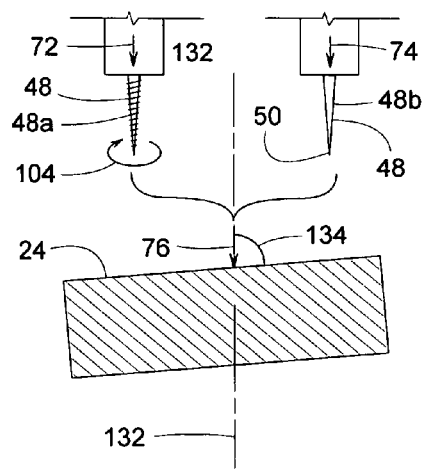
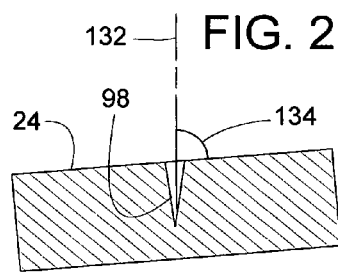
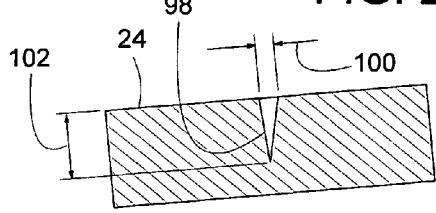

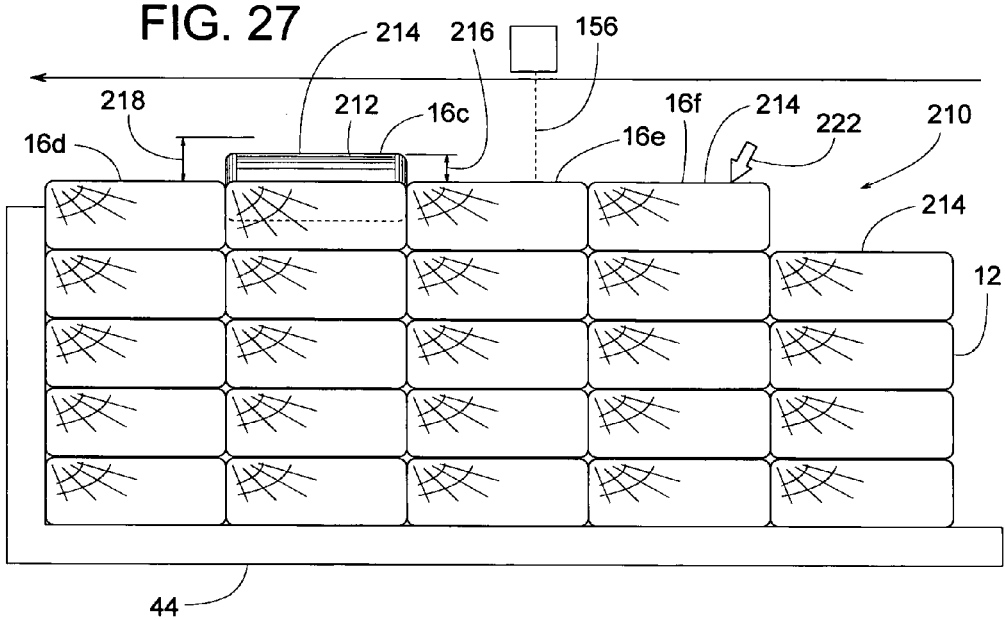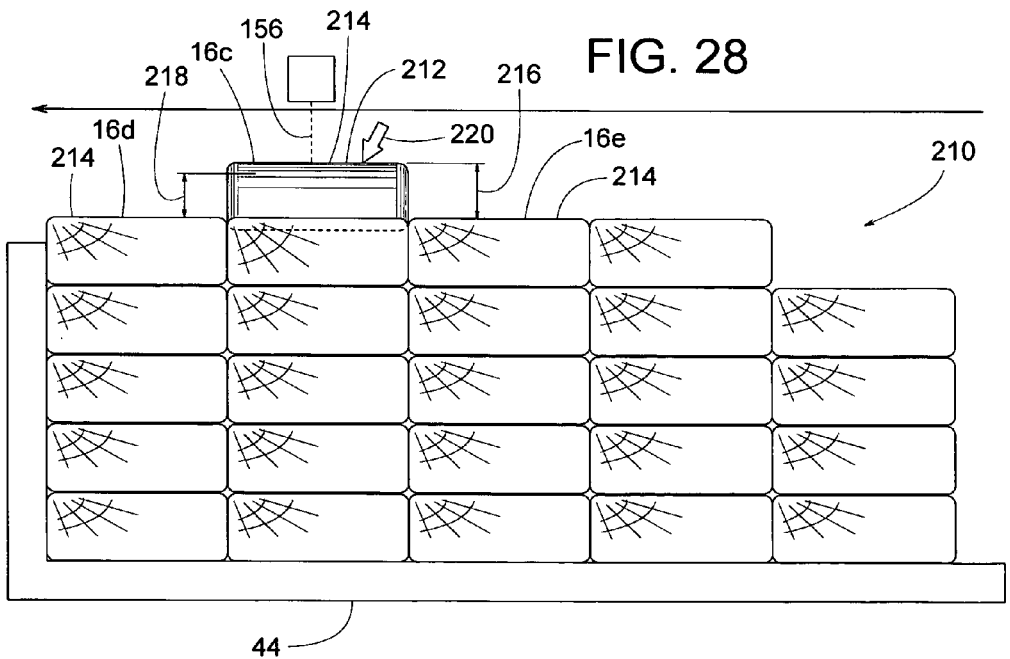

AUTOMATED LUMBER RETRIEVAL AND DELIVERY

CROSS REFERENCE TO RELATED APPLICATIONS

This application claims the benefit of provisional patent application Ser. No. 61/402,654 filed on Sep. 2, 2010 by the present inventor.

FIELD OF THE DISCLOSURE

The subject invention generally pertains to material handling and more specifically to retrieving individual pieces of lumber stacked at one or more locations and moving the pieces individually to another location.

BACKGROUND

Various machines and methods have been developed for retrieving individual pieces of lumber or boards stacked at one location and feeding the boards individually to a saw. Examples of such systems are disclosed in U.S. Pat. Nos. 6,379,105 and 6,923,614. Additional lumber handling systems are disclosed in U.S. Pat. Nos. 2,730,144; 3,873,000 and 3,952,883. A lumber processing system for making prefabricated trusses and panels is disclosed in U.S. Pat. No. 7,950,316.

BRIEF DESCRIPTION OF THE DRAWINGS

FIG. 12 is a cross-sectional end view similar to FIG. 10 but showing the board picker's piercing tool penetrating the board.

FIG. 13 is a cross-sectional end view similar to FIG. 10 but showing the board picker lifting the board.

FIG. 19 is a schematic side view showing various methods associated with the lumber handling system shown in FIG. 1.

FIG. 20 is a schematic side view showing various methods associated with the lumber handling system shown in FIG. 1.

FIG. 21 is a schematic side view showing various methods associated with the lumber handling system shown in FIG. 1.

FIG. 22 is a perspective view of an example board.

FIG. 23 is a cross-sectional view taken along line 23-23 of FIG. 22.

FIG. 24 is a schematic side view show two alternate examples of a piercing tool about to pierce a slightly tilted board FIG. 25 is a cross-sectional view of an example hole in a slightly tilted board.

FIG. 26 is another cross-sectional view of an example hole in a slightly tilted board.

FIG. 27 is a schematic side view showing a laser scanning a stack of lumber with a bowed board.

FIG. 28 is a schematic side view similar to FIG. 27 but showing the board more bowed.

DETAILED DESCRIPTION

FIGS. 1-34 at least one example of a lumber handling system 10 (and/or various features and methods thereof) for feeding lumber 12 of various sizes to a downstream processing station such as, for example, a numerically controlled saw 14 such as an Omni Miser by Koskovich/MiTek Industries of Chesterfield, Mo. or a Model ALS Alpine Linear Saw by Alpine Equipment of Grand Prairie, Tex.

Figure 2:
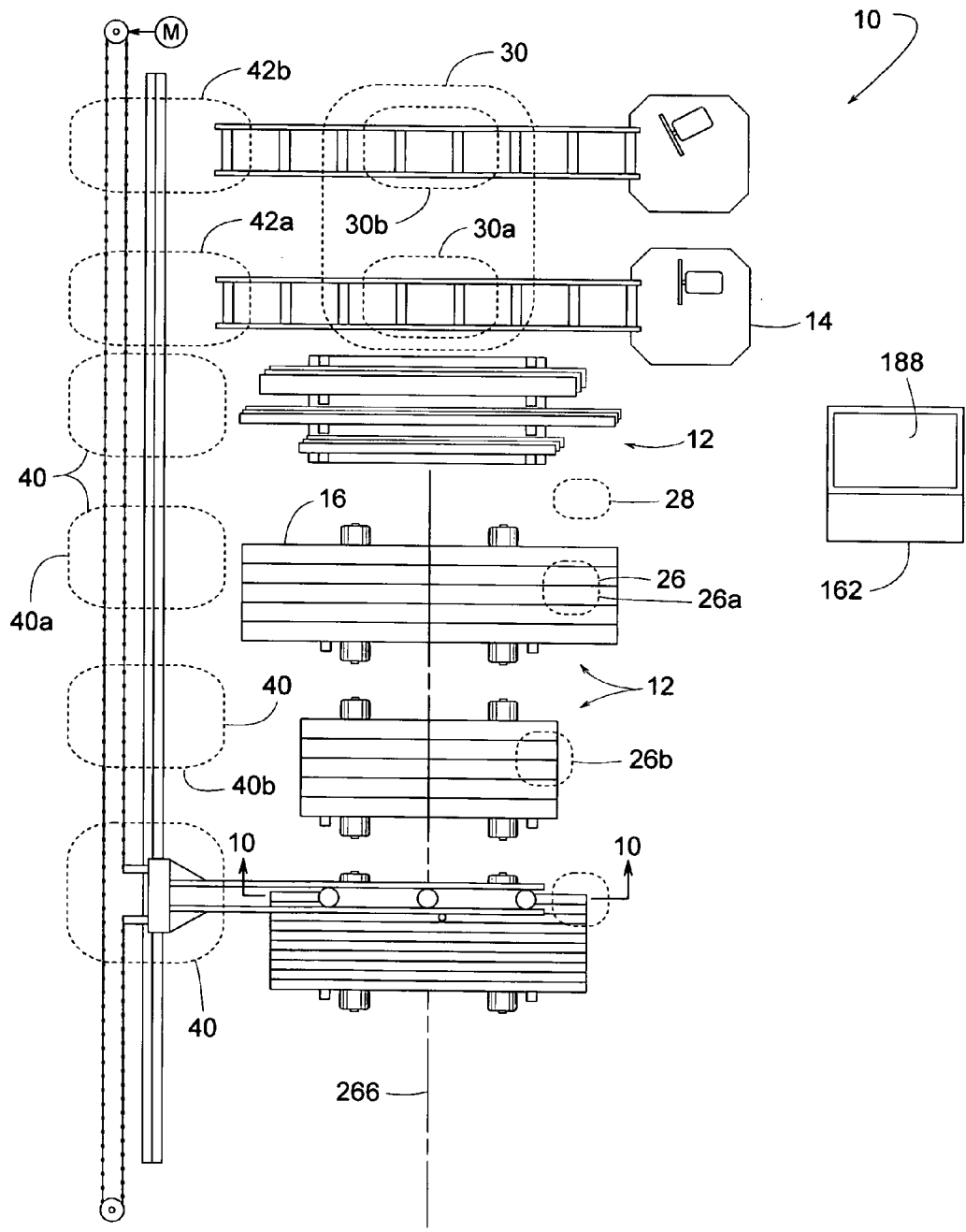
FIG. 2 is a schematic top view similar to FIG. 1 but showing an example board picker at a first retrieval position over a first-to-pick board on one stack of lumber.
Figure 3:
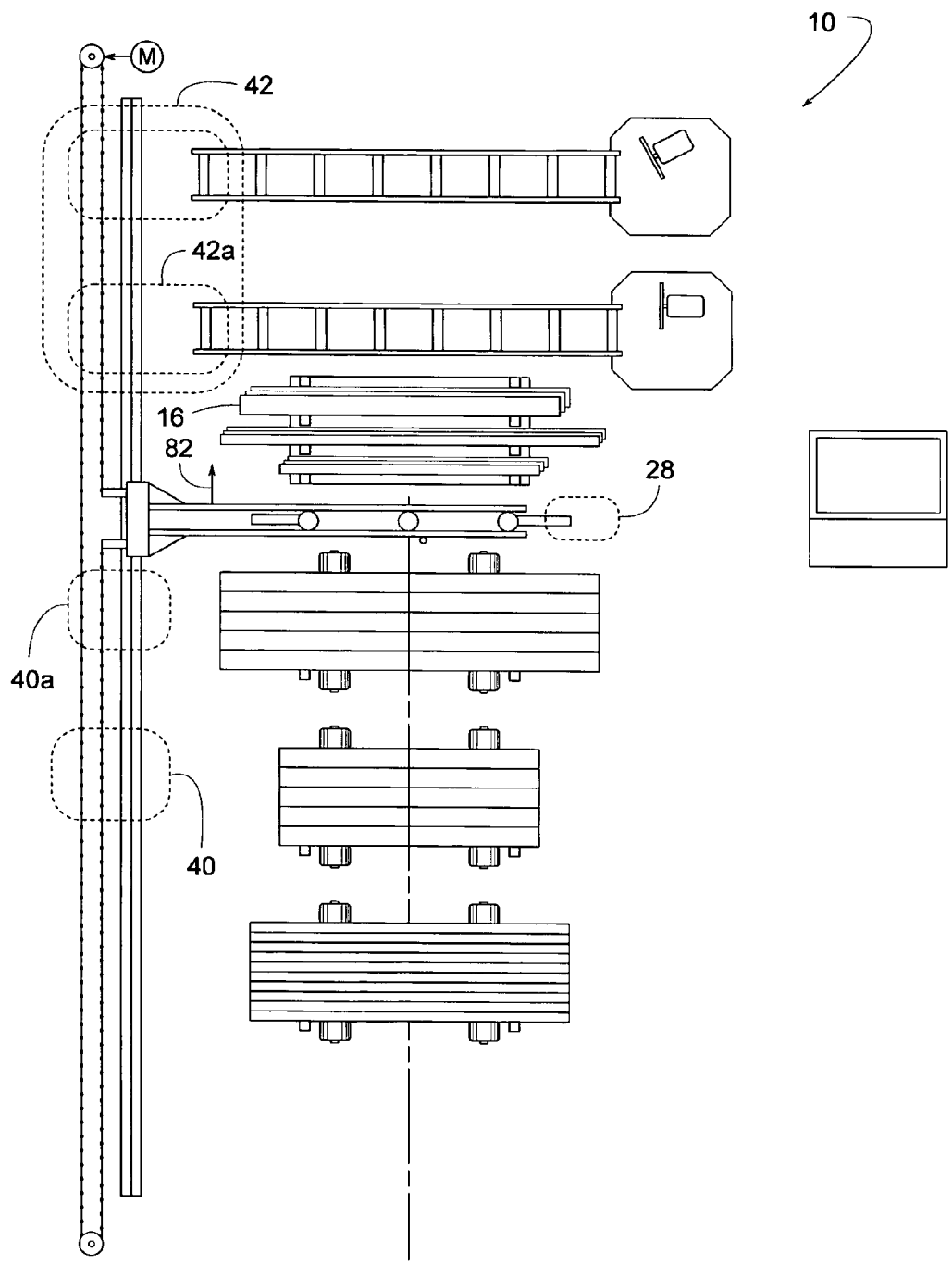
FIG. 3 is a schematic top view similar to FIG. 2 but showing the board picker traveling from the first retrieval position to a first delivery position.
Figure 4:
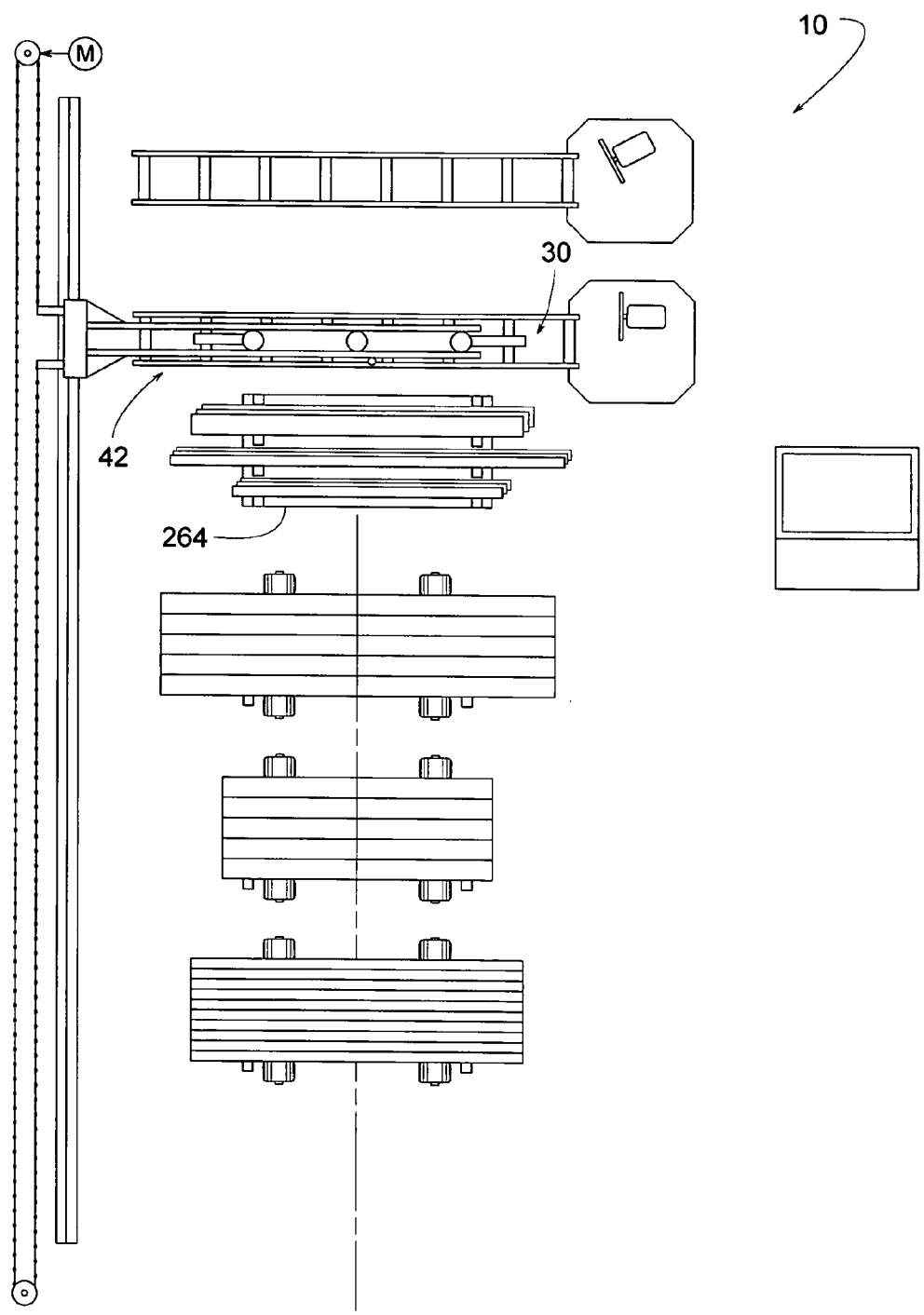
FIG. 4 is a schematic top view similar to FIG. 2 but showing the board picker at the first delivery position.
Figure 5:
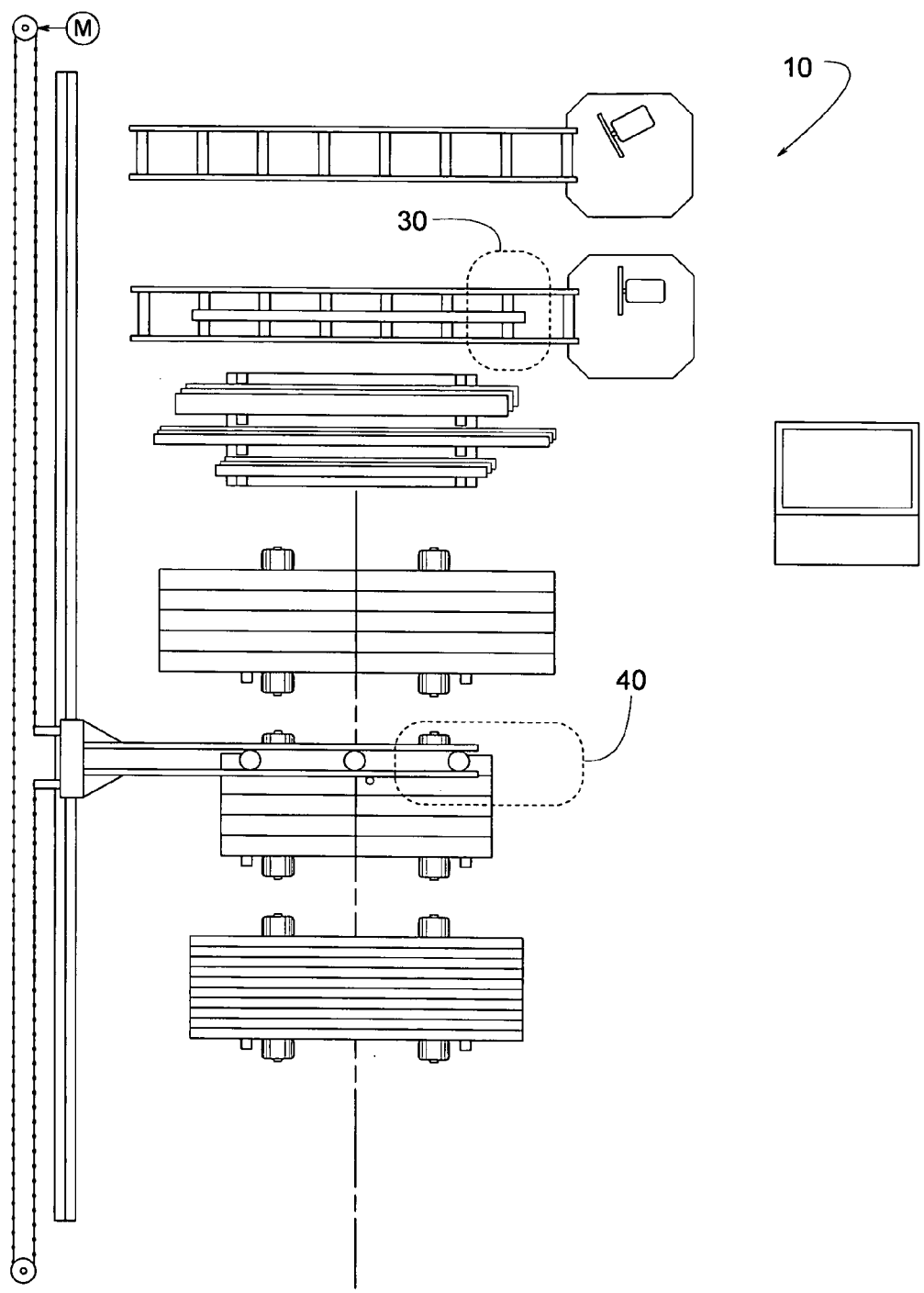
FIG. 5 is a schematic top view similar to FIG. 2 but showing the board picker at a second retrieval position over another first-to-pick board on another stack of lumber.
Figure 6:
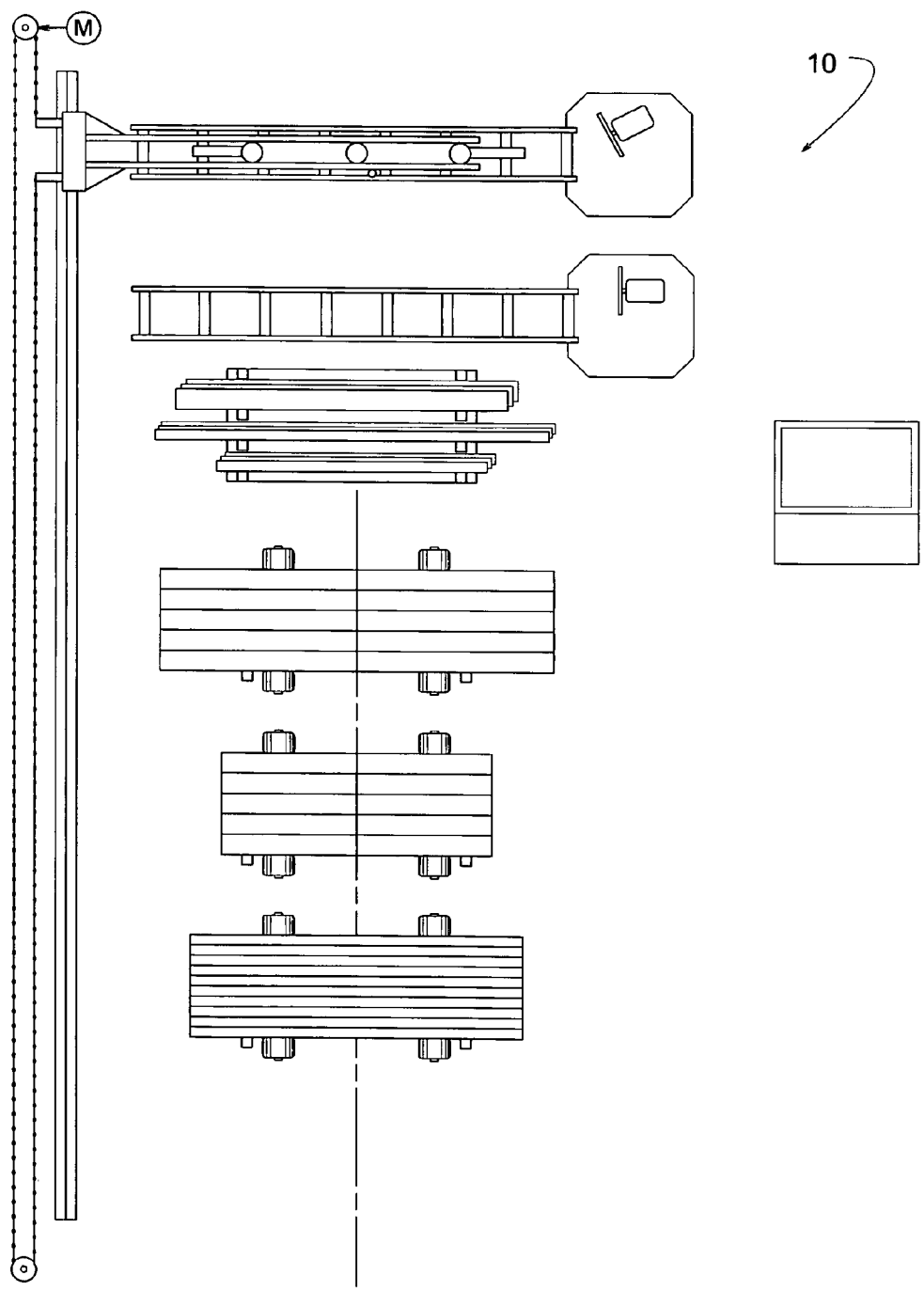
FIG. 6 is a schematic top view similar to FIG. 4 but showing the board picker at the second delivery position.

In some examples, lumber handling system 10 is used for retrieving and delivering a board 16 having an elongate length 18, a width 20 less than the elongate length 18, and a thickness 22 less than width 20, wherein elongate length 18 and width 20 define an upward facing surface 24. Board 16 is selectively movable to a stored position 26 (FIG. 2), a suspended position 28 (FIGS. 3 and 21) and a delivered position 30 (FIGS. 2, 4 and 21).

Lumber handling system 10, in some examples, comprises a track 32 extending in a lengthwise direction 34 (also referred to as retrieval direction 34) and a track follower 36 coupled to track 32. The term, "track follower" means any structure with movement guided by a track or some other elongate member. In some examples, track follower 36 is a structural beam 38 extending laterally from track 32 and being movable in lengthwise direction 34 along track 32 between a retrieval position 40 (e.g., first retrieval position) and a delivery position 42 (e.g., first delivery position 42a, second delivery position 42b, etc.). The term, "structural" as used with reference to a beam means an elongate mechanical member, fabrication or assembly, as opposed to a light beam. Thus a "structural beam" as used throughout this patent includes, but is certainly not limited to standard I-beams, channels, fabricated framework, angles, etc.

Some examples of system 10 also include a lumber support 44 (e.g., rack, cart, multi-size lumber support, shelf, etc.) with a board-supporting surface 46 supporting the weight of board 16 when board 16 is in its stored position. Some examples of system 10 also include a piercing tool 48 coupled to structural beam 38 and being movable therewith along lengthwise direction 34. The term, "piercing tool" means any member adapted to penetrate wood. Examples of piercing tool 48 include, but are not limited to, a screw 48a, a pointed pin 48b (e.g., a nail), a dagger, lance, single point blade, multipoint blade, prong, etc. Piercing tool 48, in some examples, comprises a lower tip 50. In some examples, piercing tool 48 is movable up and down between a release position 52 and a penetrated position 54 relative to upward facing surface 24 of board 16. In some examples, lower tip 50 of piercing tool 48 is appreciably above upper surface 24 and spaced apart from board 16 when piercing tool 48 is in release position 52 while structural beam 38 is in a first retrieval position 40a and board 16 is in stored position 26. In some examples, lower tip 50 is appreciably below upper surface 24 and penetrating upper surface 24 when piercing tool 48 is in penetrated position 54 while structural beam 38 is in first retrieval position 40a and board 16 is in a first stored position 26a. In some examples, lower tip 50 is appreciably below upper surface 24 and penetrating upper surface 24 when piercing tool 48 is in penetrated position 54 while board 16 is in suspended position 28 hanging from piercing tool 48. In some examples, lower tip 50 is appreciably below upper surface 24 and penetrating upper surface 24 when piercing tool 48 is in penetrated position 54 while board 16 is in suspended position 28 hanging from piercing tool 48 and while structural beam 38 is partway between first retrieval position 40a and first delivery position 42a, as shown in FIGS. 3 and 19. In some examples, lower tip 50 is appreciably above upper surface 24 and spaced apart from board 16 when piercing tool 48 is in the release position 52.

In some examples, system 10 also includes a tool carrier 56 coupling piercing tool 48 to structural beam 38 such that tool carrier 56 is movable up and down between a raised position (FIGS. 10, 13 and 14) and a lowered position (FIGS. 11, 12 and 15) relative to structural beam 38. In some examples, an actuator 58 (e.g., pneumatic cylinder, hydraulic cylinder, linear motor, drive screw, rack-and-pinion, etc.) drives the movement of tool carrier 56 relative to beam 38. In some examples, a sliding guide 60 guides the movement of tool carrier 56 relative to beam 38.

In some examples, system 10 also includes a tool mount 62 coupling piercing tool 48 to tool carrier 56 such that tool mount 62 is movable up and down between a retracted position (FIGS. 10, 11, 14 and right side of FIG. 15) and an extended position (FIGS. 12, 13 and left side of FIG. 15) relative to tool carrier 56. In some examples, an actuator 64 (e.g., pneumatic cylinder, hydraulic cylinder, linear motor, drive screw, rack-and-pinion, etc.) drives the movement of tool mount 62 relative to tool carrier 56. In some examples, tool mount 62 is mounted in substantially vertical sliding relationship with tool carrier 56.

In some examples, particularly in cases where piercing tool 48 is screw 48a, a motor 66 (e.g., pneumatic motor, hydraulic motor, electric motor, etc.) rotatably couples piercing tool 48 to tool mount 62, tool carrier 56, and/or beam 38 so that piercing tool 48 can be rotated relative to beam 38 and board 16. In some examples, motor 66 includes a gear reducer for rotating piercing tool 48 slower than a motor rotor of motor 66. In some examples, motor 66 is reversible for selectively screwing and unscrewing screw 48a.

Figure 14:
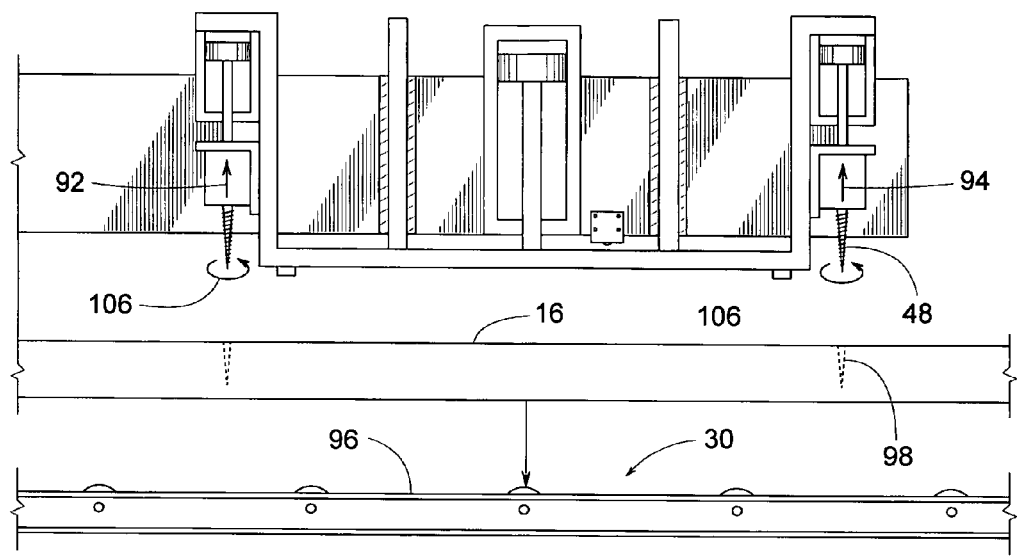
FIG. 14 is a cross-sectional end view similar to FIG. 10 but showing the board picker releasing the board at a delivery position.
Figure 15:
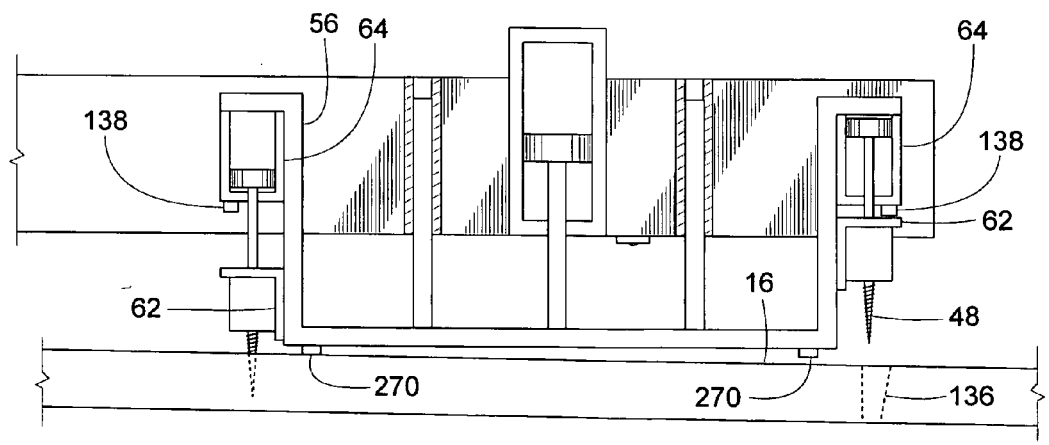
FIG. 15 is a cross-sectional end view similar to FIG. 10 but showing one piercing tool failing to grip the board.
Figure 16:
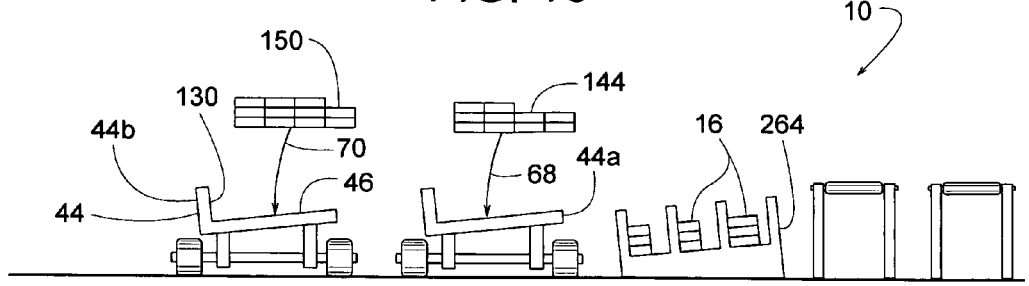
FIG. 16 is a schematic side view showing various methods associated with the lumber handling system shown in FIG. 1.

As for various methods pertaining to the examples illustrated in FIGS. 1-34, arrows 68 and 70 of FIG. 16 provide at least one example of placing a board on a lumber support. Arrows 72, 74 and 76 of FIG. 24 and arrow 78 of FIG. 33 provide at least one example of driving a piercing tool downward through an upward facing surface of the board such that the piercing tool penetrates the board to become fastened thereto. Arrow 80 of FIG. 13 provides at least one example of raising piercing tool 48 with board 16 fastened thereto, thereby lifting board 16 from lumber support 44 while board 16 hangs suspended from piercing tool 48. Arrow 82 of FIG. 3, arrows 84 and 86 of FIG. 19, and arrows 88 and 90 of FIG. 21 provide at least one example of, while a board hangs from piercing tool 48, moving piercing tool 48 and the board hanging therefrom in translation from above one or more lumber supports 44 to delivery position 30. Arrows 92 and 94 of FIG. 14 provide at least one example of extracting piercing tool 48 from board 16, thereby releasing board 16 at delivery position 30. In some examples, a conveyor 96 and/or a board-receiving elevator is at delivery position 30 to receive board 16 and ultimately transfer board 16 to saw 14. Holes 98 shown in FIGS. 1, 14, 25 and 26 provide at least one example of: upon extracting piercing tool 48 from a board leaving pierced hole 98 in the board, wherein pierced hole 98 has an average width 100 at upward facing surface 24 and a pierced depth 102. In some examples, pierced depth 102 is at least three times greater than average width 100. The term, "average width" (e.g., average width 100) is defined as the square root of [(4×A)/pi], wherein "A" is the cross-sectional area of the hole (e.g., hole 100) at board surface 24. So, for round holes, the average width is the hole's diameter at upward facing surface 24.

Figure 11:
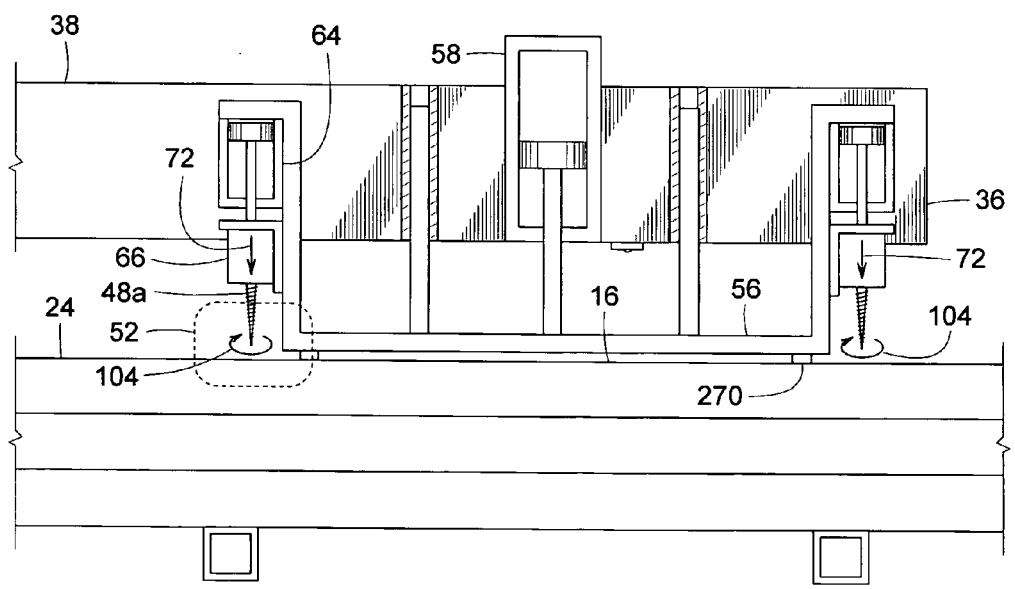
FIG. 11 is a cross-sectional end view similar to FIG. 10 but showing the board picker engaging a board.

In some examples where piercing tool 48 is screw 48a, driving piercing tool 48a downward 72 through upward facing surface 24 of board 16 and extracting (arrows 92 and 94) piercing tool 48 from board 16 involves turning 104 screw 48a as illustrated by arrows 104 of FIGS. 11 and 24 and arrows 106 of FIG. 14.

Figure 1:
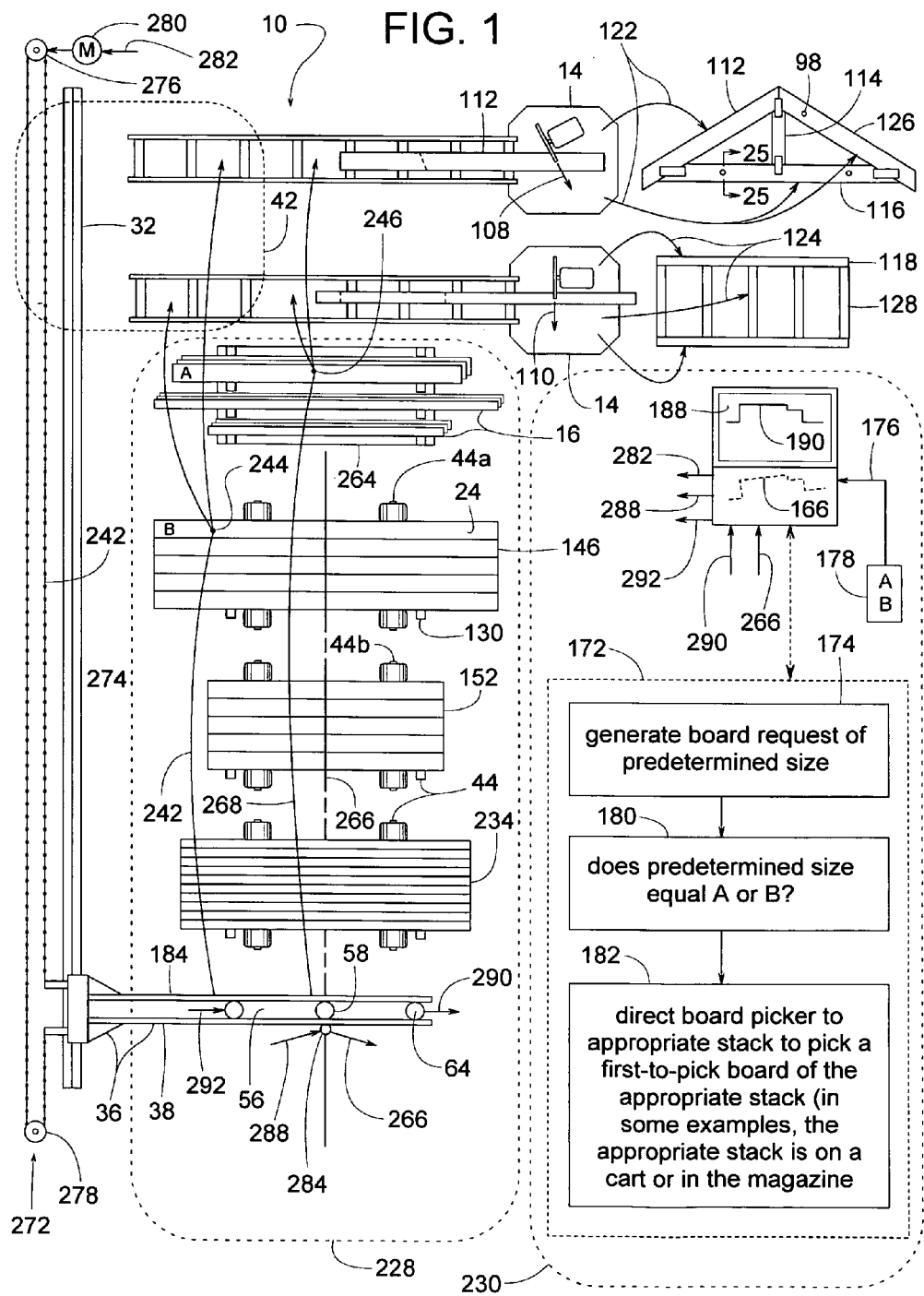
FIG. 1 is a schematic top view of an example lumber handling system.

In some examples, arrows 108 and 110 provide at least one example of cutting the board into a plurality of smaller pieces 112, 114, 116, 118 and 120. Arrows 122 and 124 of FIG. 1 provide at least one example of assembling the plurality of smaller pieces into an assembly, wherein the assembly, in some examples, is a roof truss 126 or a wall panel 128. In FIG. 1, holes 98 left in truss 126 provide at least one example of leaving pierced hole 98 exposed in the assembly, wherein the exposed pierced hole 98 provides a telltale indication of the assembly's manufacturing process and the equipment used therein. In some examples where lumber 12 is loaded onto a lumber support with board-supporting surface 46 that is slightly tilted (e.g., two degrees from level with reference to earth's gravity) to urge a stack of lumber 12 to lean back (e.g., two degrees from vertical with reference to earth's gravity) against a back support 130 to help prevent the stack from falling forward, a resulting pierced hole 98 in board 16 defines a longitudinal centerline 132 displaced out of perpendicularity with upward facing surface 24 (e.g., displaced an angle 134 of about two degrees), as illustrated by FIGS. 24-26.

Figure 29:
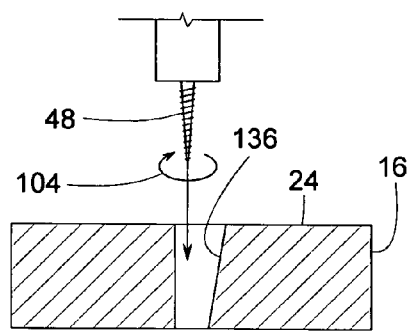
FIG. 29 is a schematic cross-sectional view showing a piercing tool attempting to pierce and lift a board with a knothole.
Figure 30:
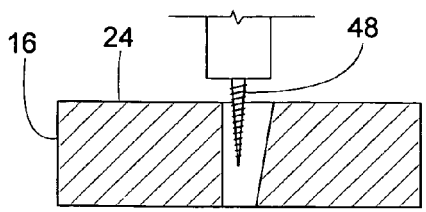
FIG. 30 is a schematic cross-sectional view similar to FIG. 29 but showing the piercing tool in the knothole.
Figure 31:
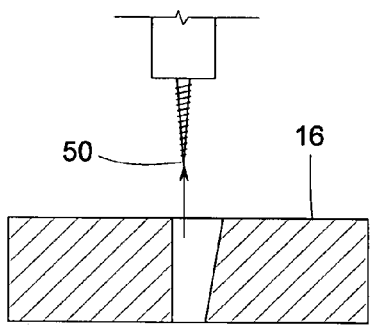
FIG. 31 is a schematic cross-sectional view similar to FIG. 30 but showing the piercing tool failing to successfully lift the board.
Figure 32:
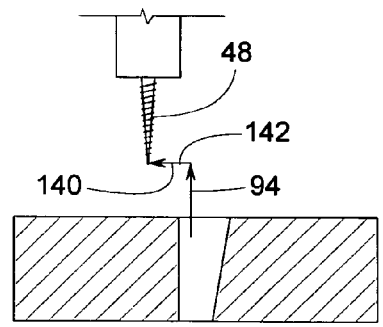
FIG. 32 is a schematic cross-sectional view similar to FIG. 31 but showing the piercing tool being shifted over for a second attempt at piercing and lifting the board.
Figure 33:
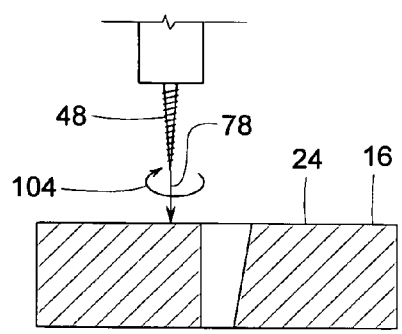
FIG. 33 is a schematic cross-sectional view similar to FIG. 29 but showing the piercing tool making a second attempt at piercing the board.
Figure 34:
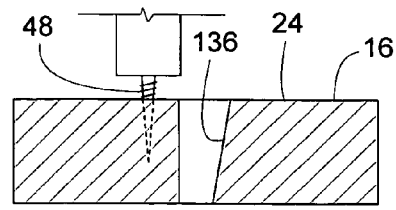
FIG. 34 is a schematic cross-sectional view similar to FIG. 30 but showing the piercing tool having successfully pierced the board.

In some examples, as illustrated in FIGS. 15 and 29-34, system 10 makes two or more attempts at picking up a board if the first attempt fails. FIGS. 29 and 30 show that prior to driving piercing tool 48 downward through upward facing surface 24 of board 16 such that piercing tool 48 penetrates board 16 to become fastened thereto (as shown in FIG. 12), failing to effectively fasten piercing tool 48 to board 16, thereby executing a failed attempt at piercing board 16, wherein FIG. 29 shows piercing tool 48 being lowered into board 16, and FIG. 30 shows a discrepancy (e.g., a void, a knot hole 136, crack, soft area of wood, hard impenetrable area, etc.) that prevents piercing tool 48 from fastening itself to board 16. FIG. 31 and the right side of FIG. 15 provide at least one example showing piercing tool 48 rising without board 16, and a sensor 138 (e.g., proximity switch associated with actuator 64 or tool mount 62, electromechanical limit switch, photoelectric eye, etc.) on the right side of FIG. 15 senses that piercing tool 48 is at its release position, thereby providing at least one example of recognizing the failed attempt. FIG. 32 provides at least one example showing, in response to recognizing the failed attempt, retracting 94 piercing tool 48; and after retracting 94 piercing tool 48, shifting 140 the piercing tool horizontally a predetermined offset distance 142. FIGS. 33 and 34 provide at least one example showing, after shifting 140 piercing tool 48 horizontally the predetermined offset distance 142, driving (represented by arrows 78 and 104) piercing tool 48 downward through upward facing surface 24 of board 16 such that piercing tool 48 penetrates board 16 to become fastened thereto, as shown in FIG. 34.

Figure 17:
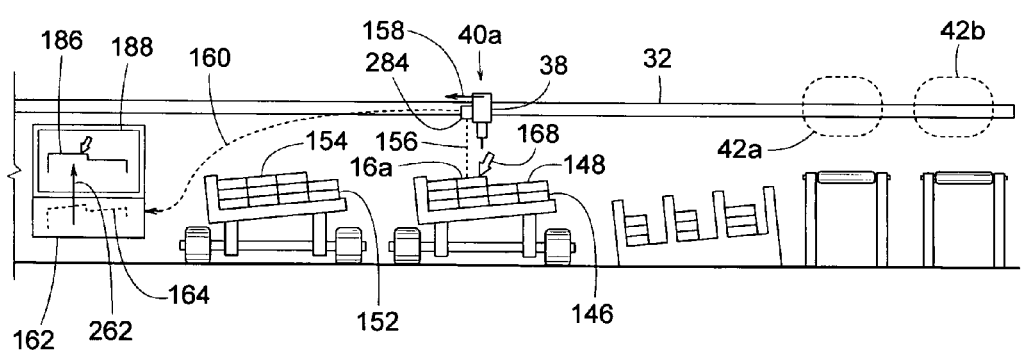
FIG. 17 is a schematic side view showing various methods associated with the lumber handling system shown in FIG. 1.
Figure 18:
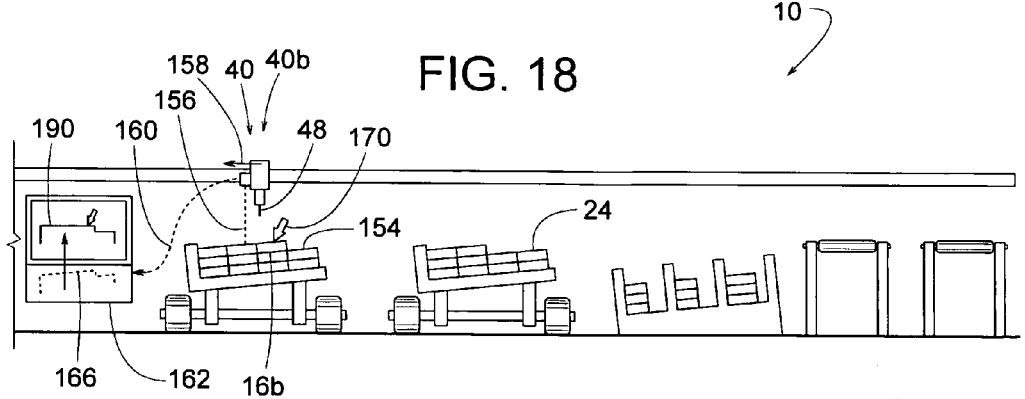
FIG. 18 is a schematic side view showing various methods associated with the lumber handling system shown in FIG. 1.

Referring to FIGS. 16-21, in some examples, arrow 68 of FIG. 16 provides at least one example showing stacking a first plurality of boards 144 on a first lumber support 44a to create a first stack of lumber 146 (FIG. 17) having a first upper contour 148, wherein the first plurality of boards 144 have a first size (size being characterized by length 18 and/or width 20, as shown in FIG. 22). Arrow 70 of FIG. 16 provides at least one example showing stacking a second plurality of boards 150 on a second lumber support 44b to create a second stack 152 of lumber having a second upper contour 154, wherein the second plurality of boards 150 has a second size that in some examples is different than the first size of the first plurality of boards 144. A laser beam 156 and arrows 158 of FIGS. 17 and 18 provide at least one example showing laser scanning first upper contour 148 and second upper contour 154. Arrow 160 in conjunction with a controller 162, shown in FIG. 17, provides at least one example showing creating a first digital profile 164 representing first upper contour 148. Arrow 160 in conjunction with controller 162, shown in FIG. 18, provides at least one example showing creating a second digital profile 166 representing second upper contour 154. Based on first digital profile 164 and second digital profile 166, arrow 168 (FIG. 17) and arrow 170 (FIG. 18) in conjunction with controller 162 provides at least one example showing identifying a first-to-pick board (e.g., boards 16a and 16b) of each of the first stack of lumber 146 and the second stack of lumber 152. In some examples, controller 162 includes software (e.g., program, algorithm, code, etc.) that identifies the first-to-pick board as being, for a given stack of lumber, a top layer board that is closest to the board's delivered position 30. In some examples, controller 162 is programmed to also execute an algorithm 172 shown in FIG. 1, wherein a block 174 illustrates generating and inputting 176 a board request 178 of a predetermined size; a block 180 illustrates determining which of the first size and the second size matches the predetermined size; block 182 illustrates: depending on which of the first size and the second size matches the predetermined size, directing a board picker 184 to at least one of the first stack of lumber 146 and the second stack of lumber 152 and further directing board picker 184 to the first-to-pick board 16a or 16b of those stacks of lumber. Board picker 184 is schematically illustrated to represent any apparatus capable of lifting board 16 up from a lumber support or stack of lumber. One example of board picker 184 is piercing tool 48 coupled to and carried by structural beam 38. Arrows 84 and 86 of FIG. 19 provides at least one example showing board picker 184 picking up first-to-pick board 16b and transporting it from the second stack of lumber 152 to a delivered position 30 spaced apart from the first stack of lumber 146 and the second stack of lumber 152.

FIG. 17 illustrates one example of displaying a digital image 186 of the first digital profile 164 on a digital display 188 (computer monitor, touchscreen, etc.), and FIG. 18 illustrates one example of displaying a digital image 190 of the second digital profile 154 on digital display 188.

In some examples, first-to-pick board 16a and/or 16b is board 16 shown in FIG. 22, wherein board 16 has an elongate length 18 (e.g., 6-20 feet), a width 20 (e.g., 4-12 inches nominal) less than elongate length 18, and a thickness 22 (e.g., 2 inches nominal) less than width 20. Width 20 extends between opposite longitudinal edges 192 of the first-to-pick board; the opposite longitudinal edges 192 are substantially parallel to each other; and the first-to-pick board, in some examples, also has a wane 194 extending along and interrupting one of the opposite longitudinal edges 192. The term, "wane," means the presence of bark or abnormal lack of wood at the edge of a board. A wane is often a prominently beveled defect created by a board being cut from a tree trunk near the trunk's outer periphery. Arrow 196 of FIG. 23 provides at least one example showing establishing a target location 198 for board picker 184 to engage the first-to-pick board, wherein target location 198 is substantially midway between the opposite edges 192 of the first-to-pick board. FIG. 23 and dashed line 200 of FIG. 22 provides at least one example showing laser scanning wane 194 but disallowing wane 194 to alter target location 198.

FIGS. 20 and 21 provide at least one example showing a board picker 184 fetching 202 a second board 16 from second stack of lumber 152 or delivering 204 second board 16 to delivered position 30. Referring to FIGS. 20 and 21, line 156 and arrows 202 and 204 provide at least one example showing second-pass laser scanning 156 the first upper contour 148 of the first stack of lumber 146 while board picker 184 is in a process of fetching 202 second board 16 from the second stack of lumber 152 or in the process of delivering 204 second board 16 to delivered position 30. Arrows 206 and 208 provide at least one example showing updating the first digital profile 164' based on the second-pass laser scanning 156 of the first upper contour 148 of the first stack of lumber 146.

FIGS. 27 and 28 show one example of a stack of lumber 210 having a bowed board 16c that bows upward to define an uppermost point 212 of an upper contour 214 as determined by laser scanning 156 of upper contour 214. FIGS. 27 and 28 also show at least one example of interposing bowed board 16c laterally between two adjacent boards 16d and 16e in stack of lumber 210, wherein bowed board 16c protrudes upward a bowed distance 216 above the two adjacent boards 16d and 16e as determined by laser scanning 156 upper contour 214. Dimension 218 of FIGS. 27 and 28 provides at least one example showing defining a predetermined distance 218. Arrow 220 of FIG. 28 provides at least one example showing identifying bowed board 16c as the first-to-pick board of stack of lumber 210 if bowed distance 216 is greater than predetermined distance 218. Arrow 252 of FIG. 27 provides at least one example showing identifying another board (e.g., a board 160 other than bowed board 16c as the first-to-pick board of stack of lumber 210 if bowed distance 216 is less than predetermined distance 218.

Figure 7:
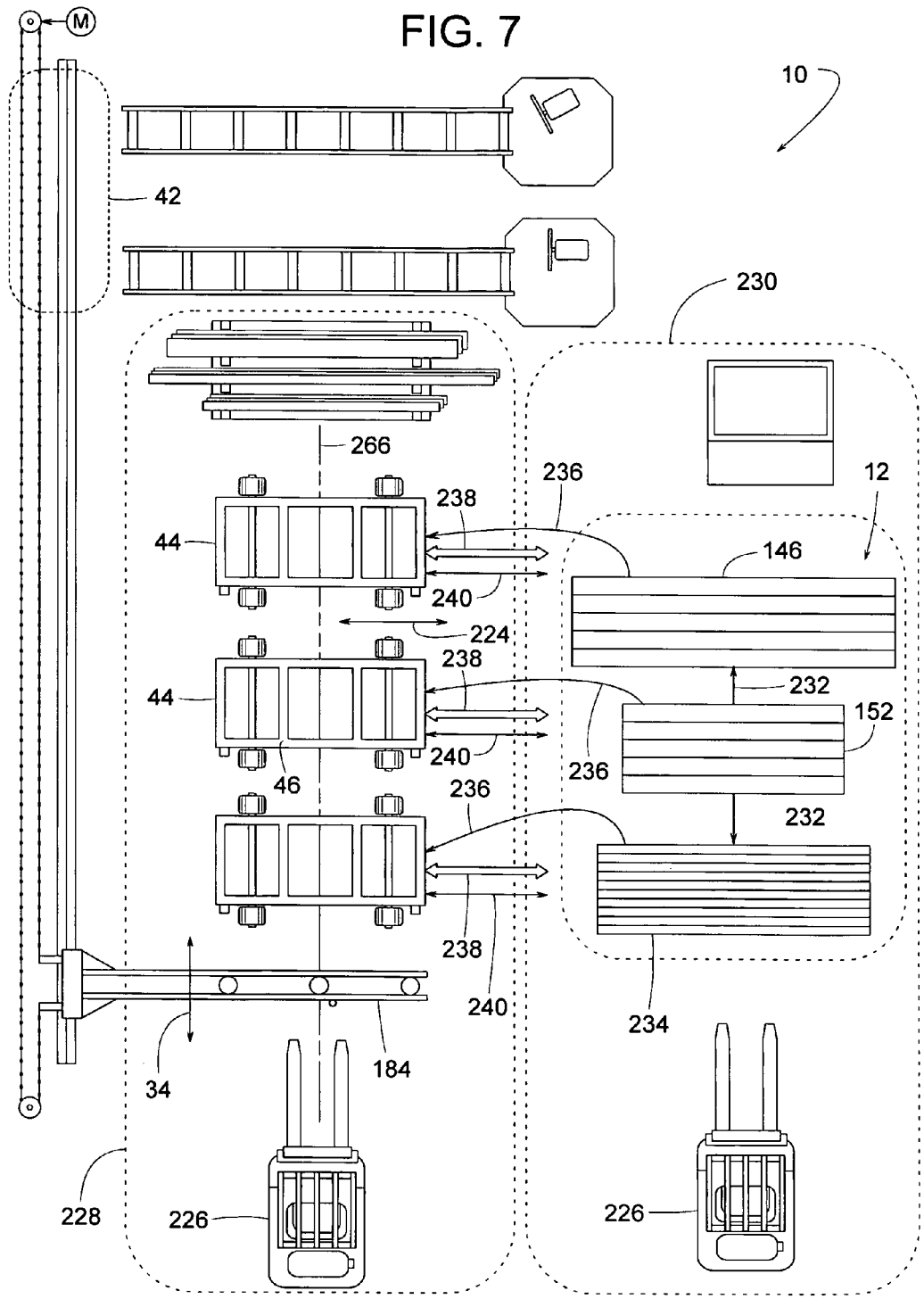
FIG. 7 is a schematic top view similar to FIG. 1 but showing various methods associated with the lumber handling system.
Figure 8:
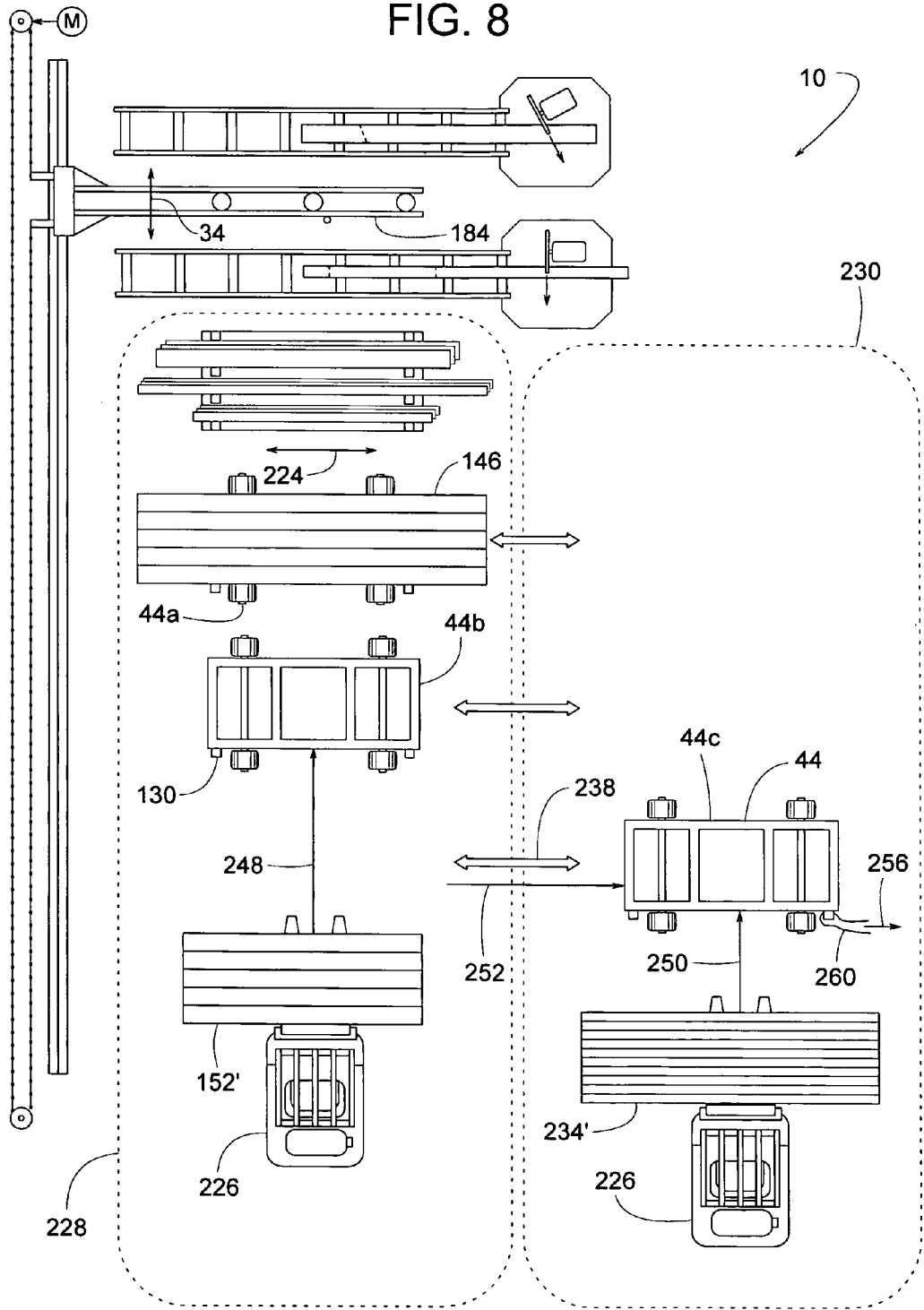
FIG. 8 is a schematic top view similar to FIG. 7 but showing additional methods associated with the lumber handling system.
Figure 9:
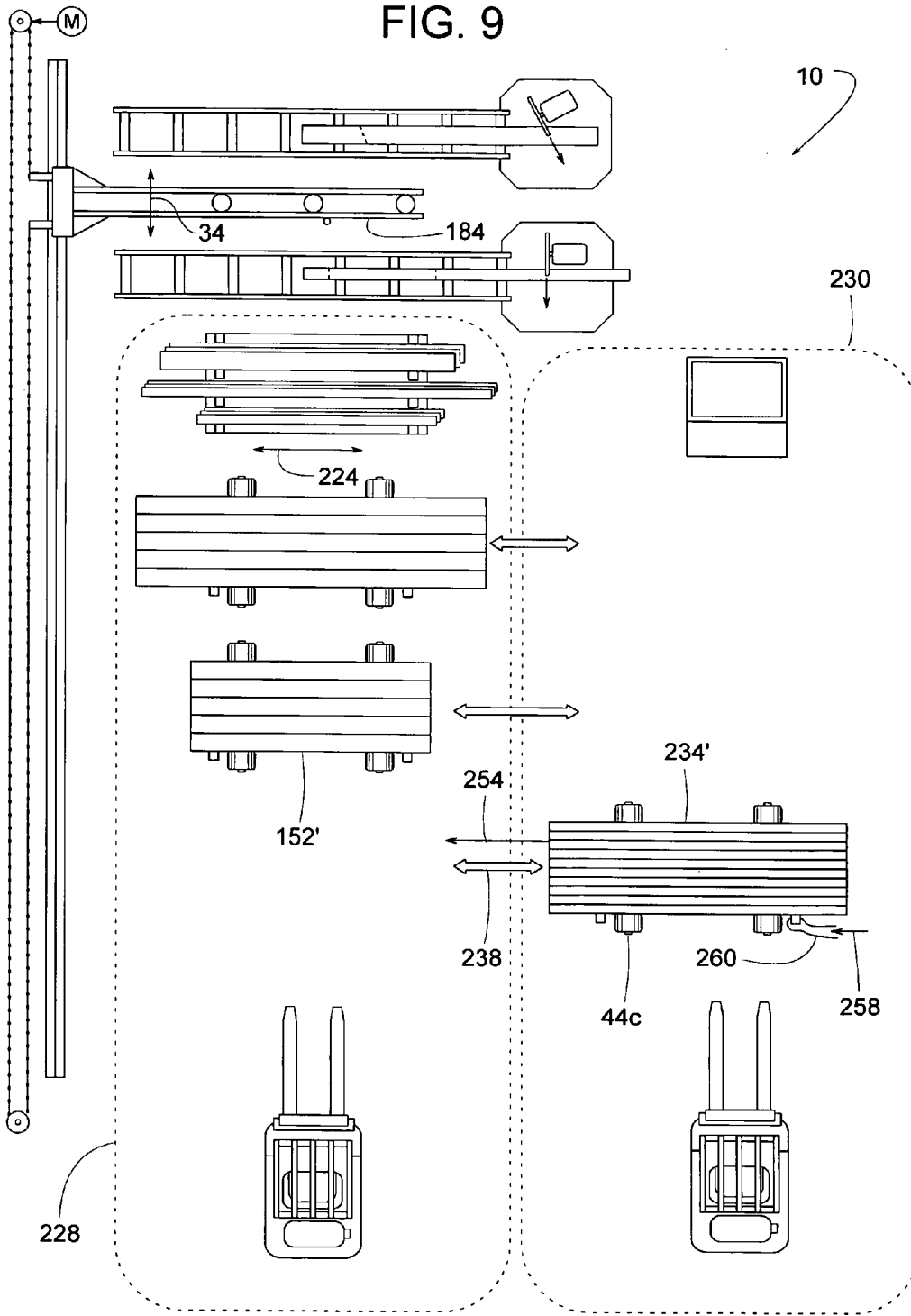
FIG. 9 is a schematic top view similar to FIG. 7 but showing additional methods associated with the lumber handling system.
Figure 10:
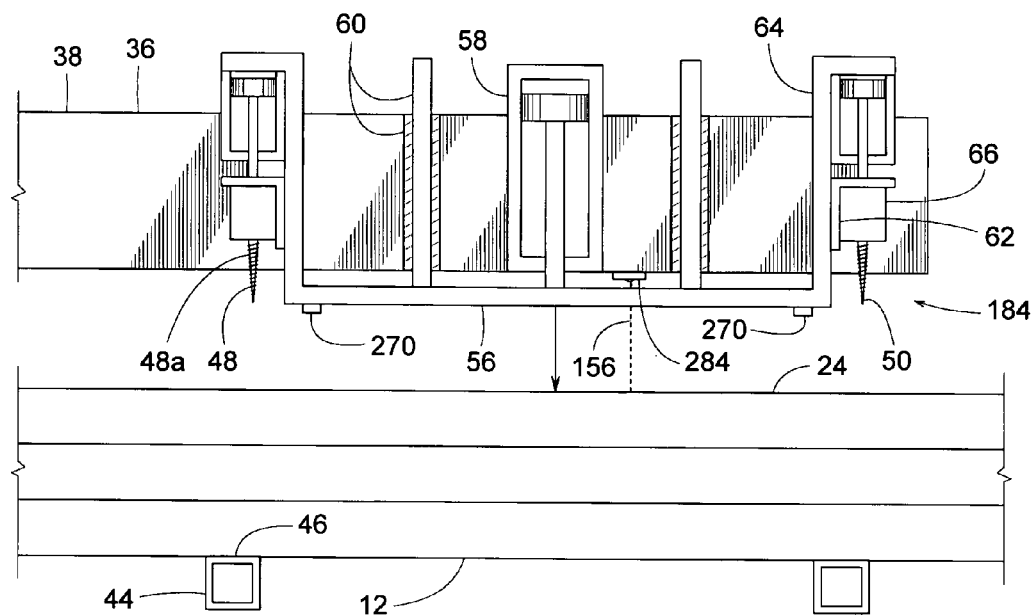
FIG. 10 is a cross-sectional end view taken generally along line 10-10 of FIG. 2.

FIGS. 7-9 illustrate convenient means for loading and replenishing lumber supports 44 with stacks of lumber. The drawing figures show board picker 184 being movable horizontally along board retrieval direction 34, the plurality of lumber supports 44 being movable horizontally in a lateral direction 224 traversing board retrieval direction 34, at least one material handling vehicle 226, and delivery position 42. The term, "direction" as used with reference to "board retrieval direction," "lateral direction," "vertical direction," etc., encompasses an infinite set of parallel lines in space (e.g., straight parallel lines or curved parallel lines), and covers moving either way along any of the lines, e.g., moving in a vertical direction encompasses moving up and down, and not necessarily just upward. The term, "material handling vehicle," means any lumber transporter. Examples of a material handling vehicle include, but are not limited to, a forklift truck, manual forklift, pallet truck, pallet jack, dolly, cart, stacker, walkie stacker, etc.

Dashed lines provide at least one example of defining a work area 228 and defining a service area 230 laterally offset to work area 228. Arrows 232 of FIG. 7 provide at least one example of segregating lumber by board size to create a plurality of lumber stacks 146, 152 and 234 that are distinguishable by board size. Lines 236 of FIG. 7 provide at least one example of loading the plurality of lumber stacks 146, 152 and 234 on the plurality of lumber supports 44 such that each lumber support 44 of the plurality of lumber supports holds one of the plurality of lumber stacks 146, 152 or 234. Lines 238 provide at least one example of defining a plurality of shuttle paths 238 extending in lateral direction 224 between work area 228 and service area 230, wherein the plurality of shuttle paths 238, in some examples, correspond in quantity to the plurality of lumber supports 44. Arrows 240 provide at least one example of selectively translating the plurality of lumber supports 44 individually between work area 228 and service area 230 and doing so via the plurality of shuttle paths 238. Arrows 242 of FIG. 1 provide at least one example of board picker 184 repeatedly translating in board retrieval direction 34 over work area 228, thereby transporting a plurality of boards individually from the plurality of lumber stacks in the work area 228 to delivered position 30. Arrows 242 are shown slightly curved simply for illustration to show that board picker 184 travels over the stacks of lumber and pausing at certain points (e.g., points 244 and/or 246) to pick up chosen boards. Arrows 248 and 250 of FIG. 8 provide at least one example of material handling vehicle 226 replenishing a chosen lumber support 44b or 44c of the plurality of lumber supports 44. Arrow 252 of FIG. 8 provides at least one example of moving one lumber support 44c of the plurality of lumber supports 44 from work area 228 to service area 230, wherein lumber support 44c travels along one shuttle path of the plurality of shuttle paths 238. Arrows 248 and 250 provide at least one example of material handling vehicle 226 traveling in board retrieval direction 34 to deliver an additional set of boards 152' or 234' to the chosen lumber support, wherein the chosen lumber support is in either work area 228 and/or service area 230. Arrow 254 provides at least one example of moving the one lumber support 44c of the plurality of lumber supports 44 from service area 230 back to work area 228, wherein the one lumber support 44c travels along the one shuttle path 238. In some examples, the chosen lumber support is the one lumber support 44c, as indicated by arrow 250 showing material handling vehicle 226 traveling in service area 230 toward chosen lumber support 44c. In some examples, the chosen lumber support and the one lumber support 44c are two separate lumber supports, as indicated by arrow 248 showing material handling vehicle 226 traveling in work area 228 toward chosen lumber support 44b. In some examples, as illustrated in FIGS. 1 and 7-9, lumber supports 44 are manually portable wheeled carts. Arrows 252, 254, 256 and 258 provide at least one example of manually 260 moving wheeled cart lumber supports between work area 228 and service area 230.

Arrow 68 of FIG. 16 with further reference to FIGS. 24-26 provides at least one example showing placing a board on a lumber support such that an upward facing surface 24 of the board is tilted at an incline, as indicated by angle 134. The term, "incline" means tilted out of perpendicularity with earth's gravity, e.g., upward facing surface 24 is not perpendicular to earth's gravity and thus surface 24 is not level. Arrow 76 of FIG. 24, arrow 72 of FIG. 11, and FIG. 12 provide at least one example showing driving piercing tool 48 in a downward direction 72 through the upward facing surface 24 of the board such that piercing tool 48 penetrates the board to become fastened thereto. Arrow 80 of FIG. 13 provides at least one example showing raising piercing tool 48 with the board fastened thereto, thereby lifting the board from lumber support 44 while the board hangs suspended from piercing tool 48. Arrows 84 and 86 of FIG. 19 provide at least one example showing, while the board hangs from piercing tool 48, moving piercing tool 48 and the board in translation from above the lumber support to a delivery position. Arrows 92 and 94 of FIG. 14 provide at least one example showing extracting piercing tool 48 from the board, thereby releasing the board at delivery position 30.

FIG. 17 provides at least one example showing laser scanning 156 upper contour 148 of a stacked plurality of boards. Lines 160, 262 and the displayed image 186 on controller 162 as shown in FIGS. 1 and 17 provide at least one example showing creating a digital profile 164 representing upper contour 148 and displaying a digital image 186 of digital profile 164, but displaying digital image 186 such that the stacked plurality of boards 146 appear to be level rather than tilted.

In some examples, as shown in FIGS. 1 and 16-21, system 10 includes separate lumber supports 44 and a multi-size lumber support 264. In some examples, each lumber support 44 holds lumber of a single board size (e.g., same nominal length and width), and the board size in any one lumber support 44 differs from the others. In addition, multi-size lumber support 264 has multiple compartments for holding relatively small quantities of odd or less common board sizes (multi-size lumber support 264 holds a supplementary plurality of boards 16 of various sizes).

FIG. 1 with further reference to FIGS. 7-9 provide at least one example showing positioning the plurality of lumber stacks in work area 228 such that a plurality of boards of the plurality of lumber stacks lie substantially perpendicular to a predefined imaginary plane 266 and are substantially centrally justified relative to the imaginary plane even while some boards of the plurality of boards are longer than other boards of the plurality of boards. FIG. 1 and FIGS. 16-21 provide at least one example showing storing a supplemental plurality of boards 16 in multi-size lumber support 264 disposed in work area 228, wherein the supplemental plurality of boards 16 have an assortment of board lengths that differ from that of the lumber on the plurality of separate lumber supports 44. Block 174 of FIG. 1 provides at least one example showing generating a board request 178 for a set of boards of various sizes (e.g., set of board includes board-A and board-B), wherein the set of boards of various sizes includes a supplemental board (e.g., board-A) from multi-size lumber support 264 and at least one board (e.g., board-B) from the plurality of boards stacked on the plurality of separate lumber supports. Arrows 242 and 268 of FIG. 1 provide at least one example showing board picker 184 repeatedly translating in board retrieval direction 34 over work area 228, thereby transporting the set of boards (e.g., including board-A and board-B) individually from the plurality of lumber stacks 44 and multi-size lumber support 264 in work area 228 to delivered position 30. In FIG. 1, arrows 242 and 268 each shown splitting provide at least one example showing board picker 184 selectively delivering to each of the two delivered positions 30a and 30b, wherein the two delivered positions feed two separate saws 14.

In some examples, additional items perhaps worth noting include items 270 in FIGS. 10-15, which provide a stop or point of engagement between tool carrier 56 and upper surface of a board. Examples of items 270 include, but are not limited to, a hard pad, a soft pad, a bumper, a serrated gripper, and any board-engaging lower surface of tool carrier 56. In some examples, items 270 help hold a board steady as piercing tool 48 approaches and is driven into the board. The term, "pierce" and derivatives thereof mean at least partially penetrating.

In some examples, hole 98 having a depth 102 that is at least three times greater than the hole's diameter or average width helps ensure that piercing tool 48, after being driven into the board, will remain stuck in the hole without an external member having to hold the piercing tool in the hole (e.g., the board can hang from piercing tool 48), yet piercing tool 48 can be forcibly extracted later. For greater holding force, in some examples, two piercing tools 48 are driven into board 16 along converging or diverging paths.

In some examples, structural beam 38 is supported in a cantilever manner from track 32. In some examples, structural beam 38 is part of a gantry with vertical support at both ends. In other examples, tool carrier 56 is suspended from an overhead monorail extending along plane 266. In some examples, such a monorail is supported by one or more stationary cantilevers having one end anchored to a wall or floor-mounted vertical post.

In some examples, as shown in FIG. 1, a drive system 272 positions and powers the movement of structural beam 38 along track 32, wherein drive system 272 comprises a cogged belt 274 supported between a drive cogged wheel 276 and an idler cogged wheel 278 with opposite ends of belt 274 being attached directly or indirectly to beam 38 and with drive wheel 276 coupled to a motor 280. In some examples, motor 280 is a model AM3042-1G00-000 servomotor by Beckhoff of Verl, Germany.

In response to various inputs, controller 162 controls various components of system 10 including, but not limited to, controlling motor 280 via an output 282, controlling board picker 184 and various actuators thereof, controlling a laser unit 284, and controlling digital display 188. Controller 262 is schematically illustrated to present any electrical device able to provide various outputs in response to various inputs. Examples of controller 262 include, but are not limited to, a computer, a PLC (programmable logic controller), etc. A specific example of controller 262 is a model CP6201-0001-0200 industrial computer by Beckhoff of Verl, Germany.

Laser unit 284 is schematically illustrated to present any device that emits a laser beam 156 for sensing a distance between a surface and the laser emitting device. An example of laser unit 284 includes, but is not limited to, a model RF603-260/1250-232-I-IN-AL-CC-3 laser triangulation position sensor provided by Riftek of Minsk, Russia. Input 286 and output 288 schematically represent control communication between controller 282 and laser unit 284. Upon scanning the upper profile of stacks of lumber to identify the first-to-pick board of a particular stack, laser unit 284 also identifies the location of each stack of lumber relative to each other and/or in relation to delivery position 30 because controller 162 being in communication with motor 280 and laser unit 284 can correlate laser scan readings with the position of board picker 184.

Input 290 and output 292 schematically represent control communication between controller 162 and board picker 184 (and its various components), wherein the board picker's various components include sensors 138, motor 66, and actuators 58 and 64. An example of sensor 138 includes, but is not limited to, a model NBB5-18GM60-A2-V1 inductive sensor provided by Pepperi-Fuchs of Mannheim, Germany.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A lumber handling method comprising:
placing a board on a lumber support;
driving a piercing tool downward through an upward facing surface of the board such that the piercing tool penetrates the board to become fastened thereto;
raising the piercing tool with the board fastened thereto, thereby lifting the board from the lumber support while the board hangs suspended from the piercing tool;
while the board hangs from the piercing tool, moving the piercing tool and the board in translation from above the lumber support to a delivery position;
extracting the piercing tool from the board, thereby releasing the board at the delivery position; and
upon extracting the piercing tool from the board, leaving a pierced hole in the board, the pierced hole having an average width at the upward facing surface and a pierced depth, the pierced depth being at least three times greater than the average width.

2. The lumber handling method of claim 1, wherein the piercing tool comprises a screw, and driving the piercing tool downward through the upward facing surface of the board and extracting the piercing tool from the board involves turning the screw.

3. The lumber handling method of claim 1, wherein the piercing tool comprises a pointed prong.

4. The lumber handling method of claim 1, further comprising:
cutting the board into a plurality of smaller pieces;
assembling the plurality of smaller pieces into an assembly, wherein the assembly is at least one of a roof truss and a wall panel; and
leaving the pierced hole exposed in the assembly.

5. The lumber handling method of claim 1, wherein the pierced hole defines a longitudinal centerline displaced out of perpendicularity with the upward facing surface.

6. The lumber handling method of claim 1, further comprising:
executing a failed attempt at piercing the board;
recognizing the failed attempt;
upon recognizing the failed attempt, shifting the piercing tool horizontally a predetermined offset distance; and after shifting the piercing tool horizontally the predetermined offset distance, driving the piercing tool downward through the upward facing surface of the board such that the piercing tool penetrates the board to become fastened thereto.

7. A lumber handling method involving the use of lumber, a board picker movable horizontally along a board retrieval direction to and from a delivered position, a plurality of lumber supports movable horizontally in a lateral direction traversing the board retrieval direction, a material handling vehicle and a board receiving area, the lumber handling method comprising:
   defining a work area;
   defining a service area laterally offset to the work area;
   segregating the lumber by board size to create a plurality of lumber stacks that are distinguishable by board size;
   loading the plurality of lumber stacks on the plurality of lumber supports such that each lumber support of the plurality of lumber supports holds one of the plurality of lumber stacks;
   defining a plurality of shuttle paths extending in the lateral direction between the work area and the service area, the plurality of shuttle paths corresponding to the plurality of lumber supports;
   via the plurality of shuttle paths, selectively translating the plurality of lumber supports individually between the work area and the service area;
   the board picker repeatedly translating in the board retrieval direction over the work area, thereby transporting a plurality of boards individually from the plurality of lumber stacks in the work area to the delivered position; and
   the material handling vehicle replenishing a chosen lumber support of the plurality of lumber supports by:
   a) moving one lumber support of the plurality of lumber supports from the work area to the service area, wherein the one lumber support travels along one shuttle path of the plurality of shuttle paths;
   b) the material handling vehicle traveling in the board retrieval direction to deliver an additional set of boards to the chosen lumber support, wherein the chosen lumber support is in one of the work area and the service area; and
   c) moving the one lumber support of the plurality of lumber supports from the service area back to the work area, wherein the one lumber support travels along the one shuttle path.

8. The lumber handling method of claim 7, wherein the one lumber support is the chosen lumber support, and the material handling vehicle traveling in the board retrieval direction to deliver the additional set of boards to the chosen lumber support travels into the service area.

9. The lumber handling method of claim 7, wherein the one lumber support and the chosen lumber support are two separate lumber supports, and the material handling vehicle traveling in the board retrieval direction to deliver the additional set of boards to the chosen lumber support travels into the work area.

10. The lumber handling method of claim 7, wherein the plurality of lumber supports are a plurality of wheeled carts, and selectively translating the plurality of lumber supports individually between the work area and the service area is done manually.

11. A lumber handling method comprising:
   placing a board on a lumber support such that an upward facing surface of the board is tilted at an incline;
   driving a piercing tool in a downward direction through the upward facing surface of the board such that the piercing tool penetrates the board to become fastened thereto;
   raising the piercing tool with the board fastened thereto, thereby lifting the board from the lumber support while the board hangs suspended from the piercing tool;
   while the board hangs from the piercing tool, moving the piercing tool and the board in translation from above the lumber support to a delivery position; and
   extracting the piercing tool from the board, thereby releasing the board at the delivery position.

12. The lumber handling method of claim 11, wherein the downward direction is angularly displaced out of perpendicularity with the upward facing surface.

13. The lumber handling method of claim 11, wherein the board is part of a plurality of boards stacked on the lumber support, the plurality of boards each being tilted at the incline of the upward facing surface of the board, the method further comprising:
   laser scanning an upper contour of the plurality of boards;
   creating a digital profile representing the upper contour; and
   displaying a digital image of the digital profile, but displaying the digital image such that the plurality of boards appear to be level rather than tilted.

14. A lumber handling method involving the use of lumber, a board picker movable horizontally along a board retrieval direction to and from a delivered position, a plurality of separate lumber supports, and a multi-size lumber support, the board picker comprising a piercing tool, the lumber handling method comprising:
   defining a work area;
   segregating the lumber by board size to create a plurality of lumber stacks that are distinguishable by board size, wherein board length and board width are two characteristics of board size;
   loading the plurality of lumber stacks on the plurality of separate lumber supports such that each separate lumber support of the plurality of separate lumber supports holds one of the plurality of lumber stacks of a given board size;
   storing a supplemental plurality of boards in the multi-size lumber support disposed in the work area, the supplemental plurality of boards having an assortment of board sizes that differ from that of the lumber on the plurality of separate lumber supports;
   generating a board request for a set of boards of various sizes, wherein the set of boards of various sizes includes a supplemental board from the multi-size lumber support and at least one board from the plurality of boards stacked on the plurality of separate lumber supports;
   the board picker repeatedly translating in the board retrieval direction over the work area;
   the board picker driving the piercing tool into the at least one board from the plurality of boards stacked on the plurality of separate lumber supports;
   suspending from the piercing tool, the at least one board from the plurality of boards stacked on the plurality of separate lumber supports;
   the piercing tool releasing at the delivered position, the at least one board from the plurality of boards stacked on the plurality of separate lumber supports;
   the board picker driving the piercing tool into the supplemental board that is in the multi-size lumber support;
   suspending the supplemental board from the piercing tool; and the piercing tool releasing the supplemental board at the delivered position.

15. The lumber handling method of claim 14, further comprising:
    laser scanning the plurality of lumber stacks, thereby finding the at least one board from the plurality of boards stacked on the plurality of separate lumber supports; and
    laser scanning the supplemental plurality of boards, thereby finding the supplemental board.

* * * * *